(12) United States Patent
Ziobro et al.

(10) Patent No.: US 7,571,570 B2
(45) Date of Patent: Aug. 11, 2009

(54) RECESSED PLASTER COLLAR ASSEMBLY

(75) Inventors: David Jude Ziobro, Fayetteville, GA (US); Vergenia Chantel Whiting, Smyrna, GA (US); Jeff Edward Underwood, Newnan, GA (US); James B. Lee, Schaumburg, IL (US)

(73) Assignee: Cooper Technologies Company, Houston, TX (US)

( * ) Notice: Subject to any disclaimer, the term of this patent is extended or adjusted under 35 U.S.C. 154(b) by 822 days.

(21) Appl. No.: 10/988,046

(22) Filed: Nov. 12, 2004

(65) Prior Publication Data

US 2005/0183344 A1    Aug. 25, 2005

Related U.S. Application Data

(60) Provisional application No. 60/519,377, filed on Nov. 12, 2003.

(51) Int. Cl.
*E02D 29/14* (2006.01)
(52) U.S. Cl. .................. 52/19; 52/20; 403/335
(58) Field of Classification Search .............. 52/19, 52/20; 403/335–338; 248/343, 342, 231.9; 362/374, 133, 147, 404, 364–368
See application file for complete search history.

(56) References Cited

U.S. PATENT DOCUMENTS

| 4,238,679 | A | * | 12/1980 | Macmillan et al. ....... 250/385.1 |
| 4,274,615 | A | | 6/1981 | Chan et al. |
| 4,456,397 | A | * | 6/1984 | Freis et al. .................... 404/25 |
| 4,499,695 | A | * | 2/1985 | Oger et al. ..................... 52/19 |
| 5,221,069 | A | | 6/1993 | Struthers et al. |
| 5,377,087 | A | * | 12/1994 | Yoon .......................... 362/275 |
| 5,560,707 | A | * | 10/1996 | Neer .......................... 362/376 |
| 6,457,848 | B1 | * | 10/2002 | Wolf et al. .................. 362/364 |
| 6,474,846 | B1 | * | 11/2002 | Kelmelis et al. ............ 362/365 |
| 6,655,093 | B1 | * | 12/2003 | Gavin ............................ 52/20 |
| 6,799,743 | B2 | * | 10/2004 | Sawayanagi ............... 248/27.1 |
| 6,979,107 | B1 | * | 12/2005 | Benensohn ................. 362/374 |
| 2003/0063470 | A1 | * | 4/2003 | Grajetzky et al. ........... 362/365 |

OTHER PUBLICATIONS

DHT/ZF, DHT/ZFS & DHT/ZO Recessed Downlight Housings, Lucifer Lighting Company, May 2002 RSA Housing, Quiet Ceiling, Jun. 2002.

* cited by examiner

*Primary Examiner*—Richard E Chilcot, Jr.
*Assistant Examiner*—Mark R Wendell
(74) *Attorney, Agent, or Firm*—King & Spalding LLP

(57) ABSTRACT

A plaster collar assembly having a first ring, a second ring secured to the first ring, and a mechanism arranged at an outer periphery of at least one of the rings for axially displacing the first and second rings during rotation of the secured rings relative to each other.

22 Claims, 4 Drawing Sheets

RECESSED PLASTER COLLAR ASSEMBLY

CROSS REFERENCE TO RELATED APPLICATIONS

This application claims priority to and the benefit of the filing date of provisional patent application entitled FLUSH MOUNT COLLAR FOR A RECESSED LIGHT FIXTURE, assigned Ser. No. 60/519,377, and filed Nov. 12, 2003, which is entirely incorporated by reference.

TECHNICAL FIELD

The technology disclosed herein generally relates to illumination, and more particularly, to a recessed housing with mounting means including a recessed plaster collar assembly.

BACKGROUND

The "INESA Lighting Handbook" published by the Illuminating Engineering Society of North America, is incorporated by reference here in its entirety. As discussed in chapter seven of that handbook, a "luminaire" is a device for producing, controlling, and distributing light. It is typically a complete lighting unit consisting of one or more lamps, sockets for positioning and protecting the lamps and for connecting the lamps to a supply of electric power, optical devices for distributing the light, and mechanical components for supporting or attaching the luminaire. Luminaires are also sometimes referred to as "light fixtures."

So-called "flush-mounted" or "recessed" luminaires are typically mounted behind a ceiling, wall, or other structure so that light is emitted through an opening cut through the outer surface of the structure. In order to hide the imperfect edges of that opening, "trim" can be arranged on the outer surface of the wall with a flange or "collar" that covers the edge of the opening. When plaster or other joint compound is added to make the collar flush with the outer surface, the collar is sometimes referred to as a "plaster" collar, or "flush trim" collar.

For example, U.S. Pat. No. 6,474,846 is incorporated by reference here in its entirety and discloses a flush trim collar lighting system partially reproduced in FIGS. 1-3 herein. As shown in FIG. 1, this conventional technology includes a support ring 19 having a radially planar portion 21 that is secured against the bottom of light accommodation box 13 by screws 25. Below the ceiling board 31, a finishing ring 41 has a radially extending flange 43 with apertures 45 to help hold wall joint compound. The finishing ring 41 is secured with respect to the support ring 19 by aligning cutouts 53 with inwardly protruding engagement structures (not shown) on the axial portion 23 of the support ring 19, and then turning the finishing ring.

Alternatively, as best shown in FIG. 2, screws 67 may be threaded through apertures 65, 71, or 73 in the support ring 19 so as to engage apertures 69 of the finishing ring 41. In another configuration shown in FIG. 3, threads 74 are provided on an outer surface of an axial portion 23 of the support ring 19 for engaging threads 75 on an internal surface of the finishing ring 41. The excess of the axial portion of the threads 74 extends downwardly past the finishing ring 41 to form a stop or rim, similar to rim 47 (in FIG. 1), to limit the concentric inner extent of drywall compound.

During installation, the metal accommodation box 13 is fitted with the support ring 19 and a central aperture 33 is formed in the wall or ceiling board 31 beneath where the box 13 is to be mounted. Next, the box 13 is secured, typically with respect to beams, rafters or other structural members of a building, in a position where the support ring 19 may partially fit through the central aperture 33. Next, the upper wall 51 of the finishing ring 41 is moved upwardly and into the axial portion 23 of the support ring 19 such that the inwardly protruding engagement structures fit within the radially outwardly disposed groove. A short turn of the finishing ring 41 secures it into place such that the radially extending flange 43 lies closely adjacent to the surrounding wall or ceiling board 31 and flatly against it.

Next, the joint compound is applied to the wall or ceiling board 31 around and onto the finishing ring 41 up to the rim 47. Typically smoothing will be performed by a wide blade tool. Once the joint compound dries, the whole area is sanded and the addition of joint compound possibly repeated. The surrounding surfaces, joint compound and possibly the rim 47 are then ready for painting.

U.S. Pat. Nos. 4,274,615 and 5,221,069 are also incorporated by reference here in their entirety.

SUMMARY

Various drawbacks of these, an other, conventional technologies are addressed here by providing a plaster collar assembly including a first ring, a second ring secured to the first ring, and a mechanism (at an outer periphery of at least one of the rings) for axially displacing the first and second rings during rotation of the secured rings relative to each other. The displacing of the first and second rings during rotation may be continuous or discontinuous over a range of the rotation.

Further, the mechanism for axially displacing the first and second rings may include a cam arranged on one of the first and second rings and a follower, arranged on the other of the first and second rings, for engaging the cam. The cam may include an inclined surface arranged on one of the first and second rings. In some embodiments, this inclined surface is substantially linear. The follower may include a radial projection from the other of the first and second rings.

In another embodiment, the plaster collar assembly may include a means for axially aligning the first and second rings during rotation. For instance, the aligning means may include an arcuate slot in at least one of the first and second rings, and the slot may also receive a pin extending between the rings. In some embodiments, this pin may be a fastener.

Another embodiment of the plaster collar assembly may include means for rotationally locking the first and second rings. For example, this locking means may include a fastener for securing the first and second rings to each other and a spring, in communication with the fastener, for urging the first and second rings together. The spring may be a leaf spring, and the leaf spring my include an arcuate slot for receiving and guiding the fastener during rotation.

Another embodiment of this technology offers a plaster collar assembly including a first ring, a second ring secured to the first ring, and means, arranged at an outer periphery of at least one of the rings, for axially displacing the first and second rings during rotation of the secured rings relative to each other. This plaster collar assembly may also include a means for axially aligning the first and second rings during rotation, and means for rotationally locking the first and second rings.

In one embodiment, a cam is arranged on one of the first and second rings, and a follower for engaging the cam is arranged on the other of the first and second rings. The locking means may include a fastener for securing the first and second rings to each other, and a spring, in communication with the fastener, for urging the first and second rings together. The aligning means may include an arcuate slot in at least one of the first and second rings, wherein the arcuate slot receives a pin extending between the rings.

Yet another embodiment of this technology offers a luminaire with a recessed housing and a plaster collar assembly secured to the recessed housing. The plaster collar assembly may include a first ring, a second ring secured to the first ring, and a mechanism (at an outer periphery of at least one of the rings) for axially displacing the first and second rings during rotation of the secured rings relative to each other.

In one embodiment, the first and second rings are secured to a circular lip extending from the recessed housing. In another embodiment, the rings may be axially displaced continuously over a range of the rotation.

In another embodiment, the mechanism for axially displacing the first and second rings includes a cam arranged on one of the first and second rings, and a follower, arranged on the other of the first and second rings, for engaging the cam.

In another embodiment, the recessed lighting fixture may include a means for axially aligning the first and second rings during rotation. The aligning means may include an arcuate slot in at least one of the first and second rings, wherein the arcuate slot receives a pin extending between the rings.

Another embodiment of the recessed lighting fixture includes means for rotationally locking the first and second rings. This locking means may include a fastener for securing the first and second rings to each other, and a spring, in communication with the fastener, for urging the first and second rings together.

BRIEF DESCRIPTION OF THE DRAWINGS

Various aspects of this technology will now be described with reference to the following figures ("FIGS.") in which the same reference numerals are used to designate corresponding parts throughout each of the several views.

DETAILED DESCRIPTION

Figure 1:
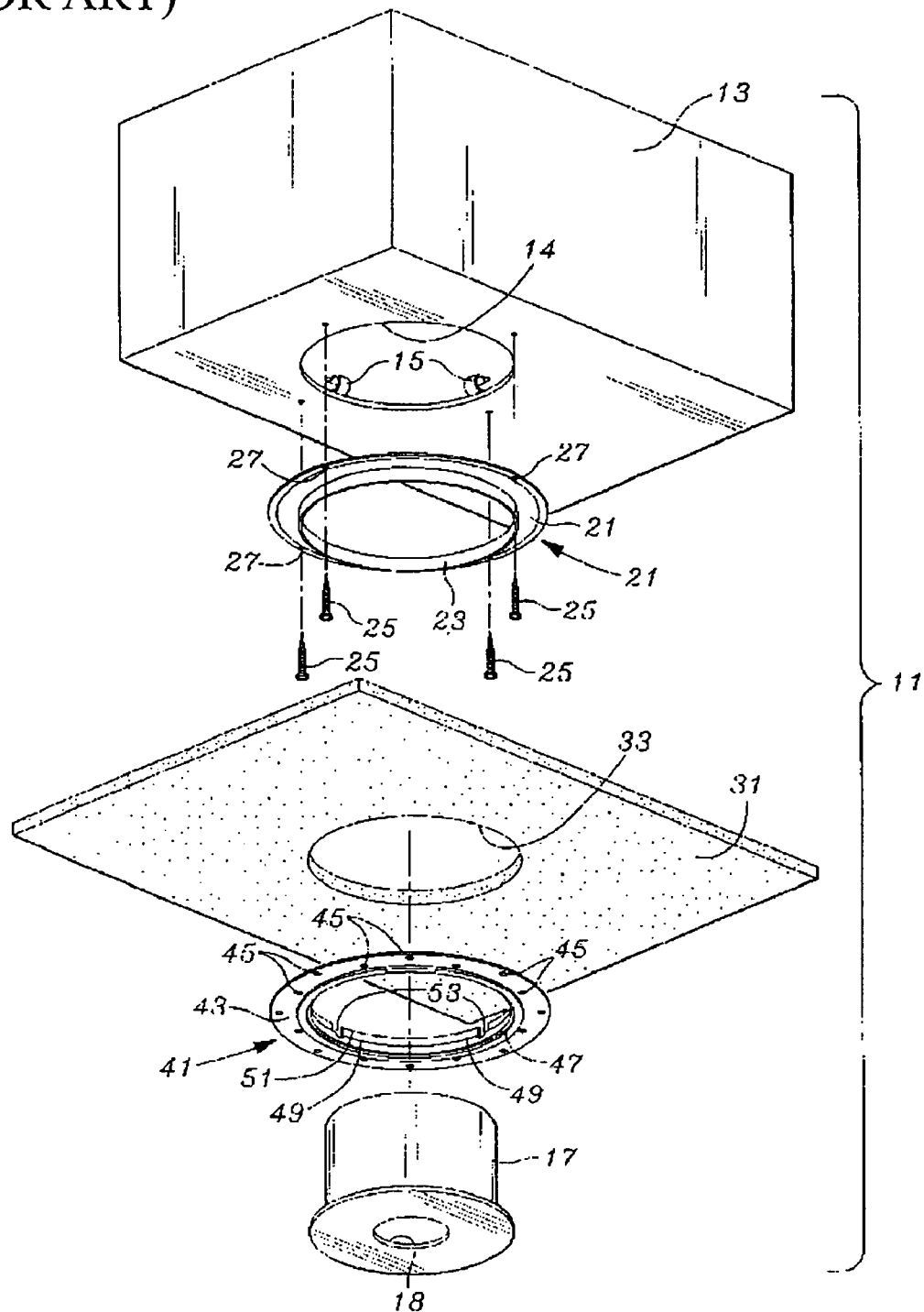
FIG. 1 is an exploded view of a conventional flush trim collar lighting system.
Figure 2:
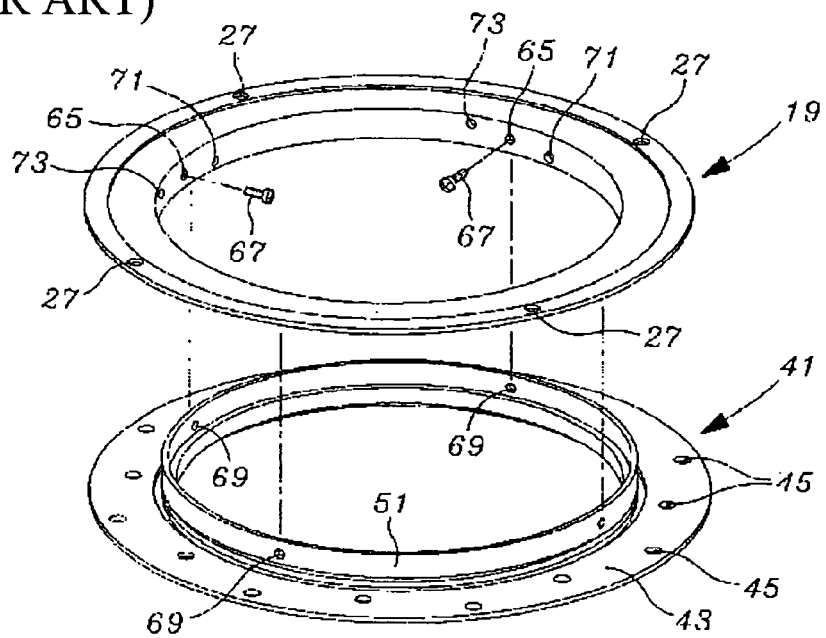
FIG. 2 is a detailed view of the rings in the lighting system of FIG. 1.
Figure 4:
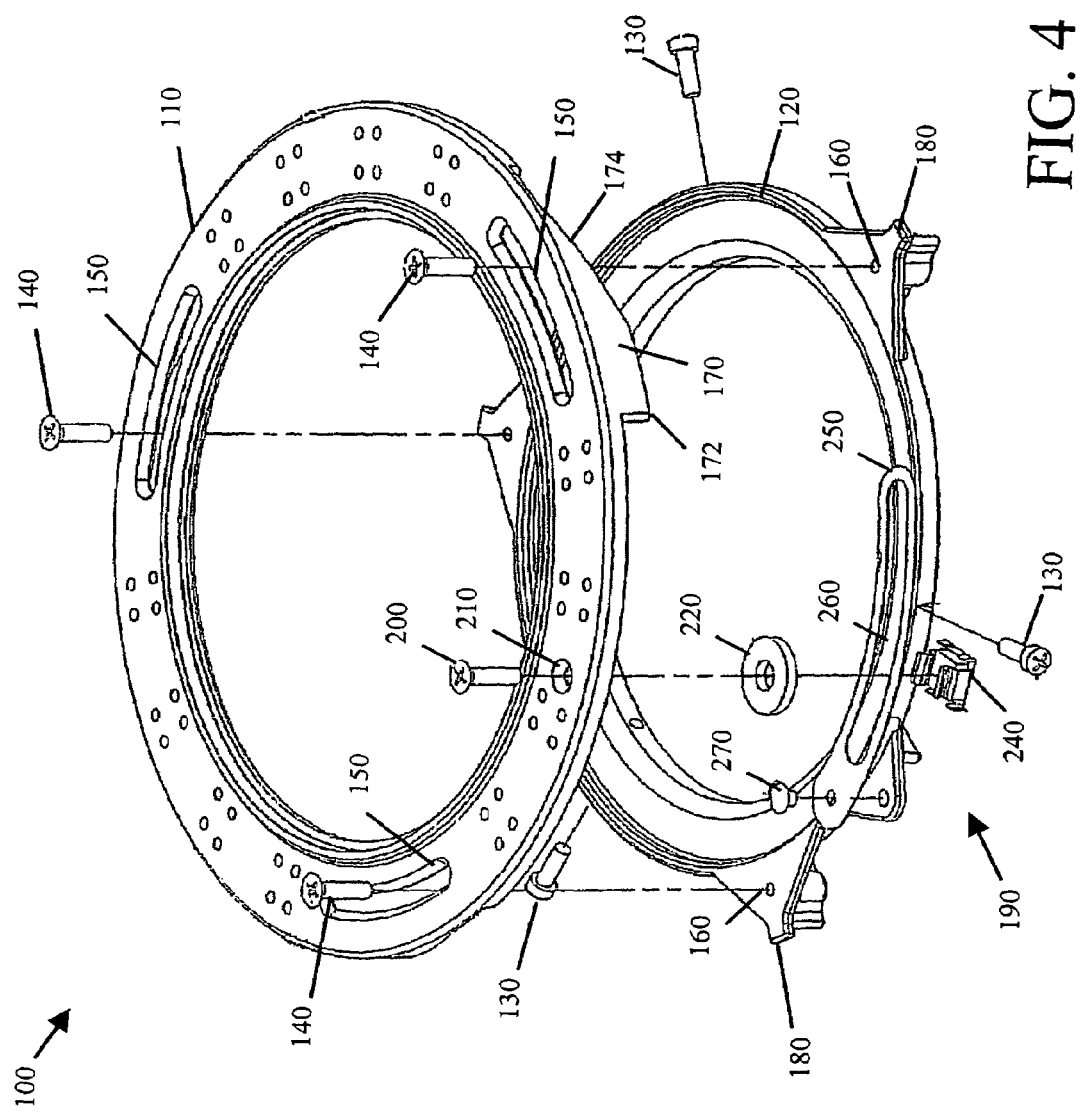
FIG. 4 is an exploded view of a recessed plaster collar assembly.
Figure 5:
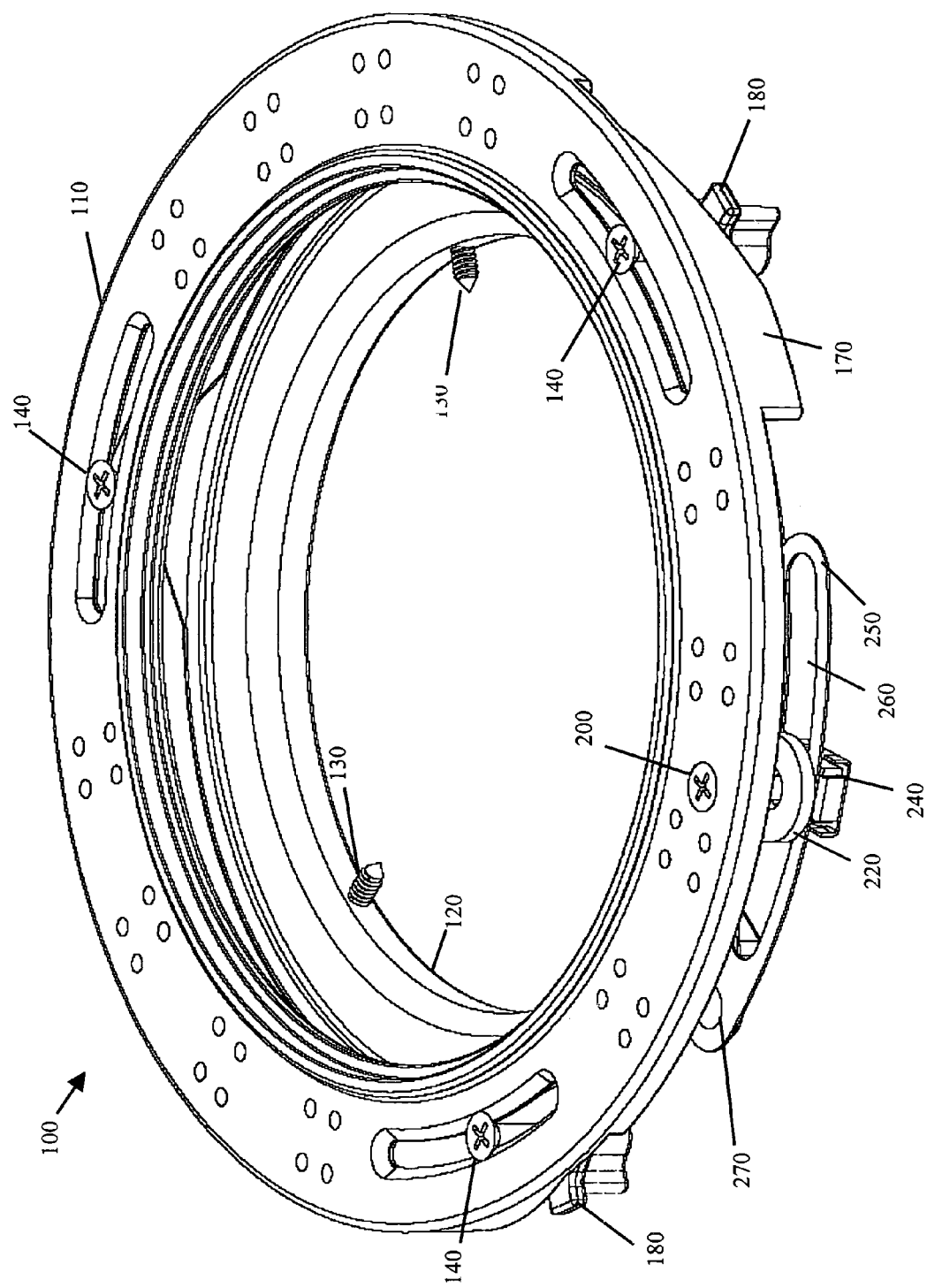
FIG. 5 is an assembled view of the recessed plaster collar assembly of FIG. 4.

FIGS. 4 and 5 illustrate one embodiment of a recessed plaster collar assembly 100 including a plaster ring (or outer collar) 110 and a support ring (or inner collar) 120 secured to the plaster ring. During normal operation, the support ring 120 is fastened, or otherwise secured, to the bottom side of a typical recessed luminaire housing, such as the accommodation box 13 shown in FIG. 1. In the embodiment illustrated in FIGS. 4 and 5, one or more set screws 130 extend through the support ring 120 for engaging a sleeve (not shown) extending downward from the opening 14 in the housing 13. However, the support ring 120 may be secured to the housing with any other suitable device, including with screws, bolts, adhesives, welding, or threaded coupling.

As best shown in FIG. 4, the plaster ring 110 in the illustrated embodiment is rotatably aligned with the support ring 120 by vertical adjustment pins 140 that extend through arcuate slots 150 and engage threaded holes 160 in the support ring 120. For example, the adjustment pins may be in the form of screws or bolts. However, a variety of other fasteners, pins, and/or other alignment devices may also be used to extend between the rings 110 and 120 in order to maintain their axial alignment.

The plaster collar assembly 100 also includes a mechanism for axially displacing the first and second rings during rotation of the secured rings relative to each other. As discussed in Marks' Standard Handbook for Mechanical Engineers, eighth edition, which is also incorporated by reference herein its entirety, a mechanism is that part of a machine which contains two or more pieces so arranged that the motion of one compels the motion of the others according to a definite law depending upon the nature of the combination. Cams are one such mechanism. A cam is usually a plate or cylinder which communicates motion to a follower by means of its edge or a groove cut in its surface.

As shown in FIG. 4, cams 170 extend downward from the outer peripheral edge of the plaster ring 110. Although only one cam 170 is visible in FIG. 4, other cams are also arranged near each of the arcuate slots 150. The bottom of each of the cams 170 includes a flat cam surface 172 and an inclined cam surface 174. Although the illustrated cam surfaces are linear, other embodiments may include any combination of curved, continuous, and/or discontinuous cam surfaces in order to produce a variety of motions.

Followers 180 extend from the outer periphery of the support ring 120 for engaging the cams 170. Although an equal number of cams 170 and followers 180 are shown in the drawings, different numbers of cams and followers may also be provided so that not every cam engages a follower. Similarly, the cams 170 and followers 180 do not necessarily have to be arranged near the arcuate slots 150 and the threaded holes 160. However, arranging the cams 170 and followers 180 near slots 150 allows the followers to be arranged as radial projections in which the holes 160 are formed for receiving the vertical adjustment bolts or pins 140. Furthermore, any of the slots 150, threaded holes 160, cams 170, and/or followers 180 may be arranged on opposite ones of the rings 110 and 120.

Figure 3:
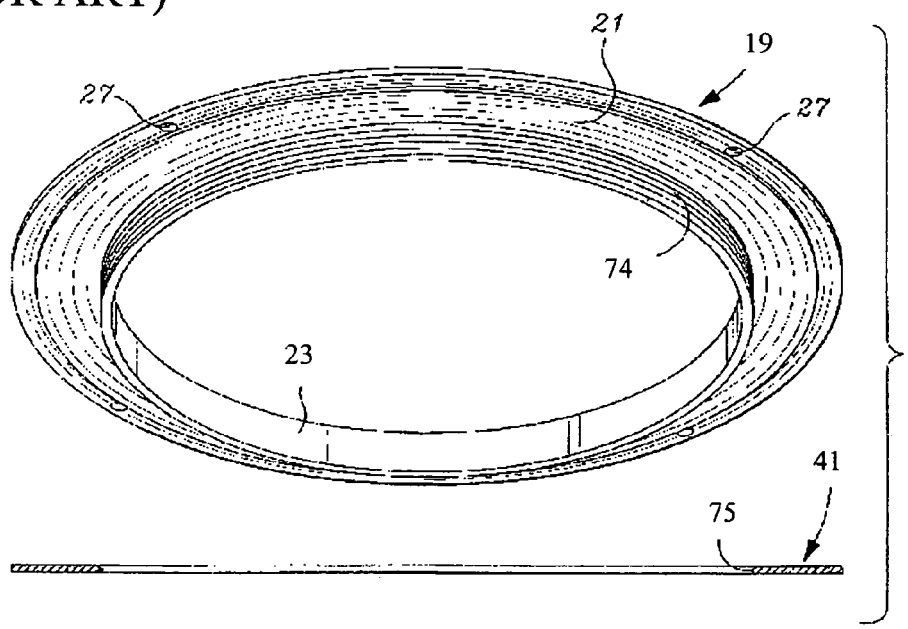
FIG. 3 is a detailed view of other conventional rings for use with the lighting system of FIG. 1.

The cams 170 and followers 180 are preferably arranged on the outer periphery of the rings 110 and 120 so as not to obstruct the opening (33 in FIG. 1) in the wall or ceiling. Furthermore, this arrangement allows both rings to be arranged entirely inside the opening (33 in FIG. 1) without the need for flanges that overlay the outer wall surface. Consequently, the plaster ring assembly 100 can be secured to a luminaire before the luminaire is mounted in the ceiling. This arrangement also avoids rims (47 in FIG. 1) or excess threads (74 in FIG. 3) that may otherwise extend past the outer surface (31 in FIG. 1) of the wall for limiting the concentric inner extent of drywall compound.

In practice, the axial displacement between plaster ring 110 and support ring 120 is adjusted by rotating plaster ring 110 about the vertical axis. The rotation causes follower 180 to first slide along the flat cam surface 172, and then along the inclined surface 174 so that the distance between the two rings is controlled by the height of the cam 170. At the same time, the vertical adjustment screws 140 in arcuate slots 150 maintain the axial alignment of the rings 110 and 120.

While the vertical adjustment bolts 140 may help to prevent the rings 110 and 120 from coming apart axially, an optional rotational locking assembly 190 may also be provided to prevent rotation between the rings once they are positioned. In the illustrated embodiments, the rotational locking assembly 190 includes a rotation lock screw 200, extending through hole 210 in plaster ring 110, with a washer 220 and cage nut 240 for fastening, or otherwise securing, the rings 110 and 120 to each other. In one embodiment, washer 200 may comprise rubber or other elastomers to provide friction for locking rings 110 and 120 together. A leaf spring 250, attached to ring 120 through fastener 270, in communication with the rotation lock screw 200 then urges the rings 110 and 120 toward each other. However, other types of resilient devices may also be used, such as coiled, laminated, or helical springs and resilient elastomers. In the illustrated embodiment, the leaf spring 250 includes an arcuate slot 260 for slidably engaging the top portion of the cage nut 240 and maintaining the rings 110 and 120 in a state of compression as shown in the assembled view of FIG. 5.

The recessed plaster collar assembly 100 described above can be secured to the bottom of the housing platform before or after the luminaire is mounted in the ceiling or wall and wired according to code. For example, the collar assembly can be attached onto the luminaire housing at the factory or shipped separately and attached to the luminaire at the installation site. The mounted luminaire is preferably provided with a bag containing wire mesh and an instruction sheet for the drywall contractor to retrieve. Once the drywall is installed, a roto zip or other tool can be used to cut an opening around the plaster collar assembly 100. The trim edge of the opening is then cleaned and the plaster collar assembly 100 is adjusted to be level with the outer surface of the drywall using the following steps.

First, the rotation lock screw 200 is loosened, being careful not to remove the screw completely. Then the three depth adjustment screws 140 are loosened until the plaster collar 110 is level with the installed drywall. A straight-edge knife or level can be arranged across the drywall opening in order to ensure the proper position. Once the plaster collar 110 is located to the proper height inside the drywall opening, the collar 110 is twisted counter-clockwise (clockwise in FIG. 4) until it stops. Then the rotation lock screw 200 is re-tightened while holding the plaster collar 110. Once it is confirmed that the plaster collar 110 is still at the proper height, the vertical adjustment screws 140 are tightened until they are flush with the collar.

The mesh drywall cover can then be attached to the opening and a razor knife can be used to gently cut the mesh around the outside edge of the mud lip at plaster ring 110. Next, a skim coat of plaster joint compound is applied to flush the ceiling up to the edge of the mud lip, and any excess may be wiped from inside the opening in the plaster collar 110. Then, the skim coat is sanded to blend into the ceiling before priming and painting.

It should be emphasized that the embodiments described above, and particularly any "preferred" embodiments, are merely examples of various implementations that have been set forth herein to provide a clear understanding of various aspects of this technology. One of ordinary skill will be able to alter many of these embodiments without substantially departing from the scope of protection defined solely by the proper construction of the following claims.

What is claimed is:

1. A plaster collar assembly, comprising:
   a first ring;
   a second ring secured to the first ring; and
   a mechanism for axially displacing the first and second rings during rotation of the rings relative to each other comprising:
      a cam disposed along an outer periphery of one of said first and second rings; and
      a cam follower contacting the cam to axially displace the first and second rings, the cam follower disposed on the other of said first and second rings;
      wherein the cam follower extends radially outward from an outer edge of the other of the first and second rings.

2. The plaster collar assembly of claim 1, wherein said displacing is continuous over a range of said rotation.

3. The plaster collar assembly of claim 1, wherein said cam comprises an inclined surface arranged on said one of the first and second rings.

4. The plaster collar assembly of claim 3, wherein said inclined surface is substantially linear.

5. The plaster collar assembly of claim 1, wherein said follower comprises a radial projection from said other of the first and second rings.

6. The plaster collar assembly of claim 5, wherein said cam comprises an inclined surface arranged on said one of said first and second rings.

7. The plaster collar assembly of claim 1, further comprising means for axially aligning said first and second rings during rotation.

8. The plaster collar assembly of claim 7, wherein said aligning means includes an arcuate slot in at least one of said first and second rings, the arcuate slot for receiving a pin extending between said rings.

9. The plaster collar assembly of claim 8, wherein said pin is a fastener.

10. The plaster collar assembly of claim 1, further comprising means for rotationally locking said first and second rings.

11. The plaster collar assembly of claim 10, wherein said locking means comprises:
    a fastener for securing said first and second rings to each other; and
    a spring, in communication with the fastener, for urging said first and second rings together.

12. The plaster collar assembly of claim 11, wherein said spring is a leaf spring.

13. The plaster collar assembly of claim 12, wherein said leaf spring includes an arcuate slot for receiving and guiding said fastener during rotation.

14. A plaster collar assembly, comprising:
    a first ring;
    a second ring secured to the first ring; and
    means for axially displacing the first and second rings during rotation of the secured rings relative to each other, said means comprising:
       a cam disposed along and extending axially from an outer periphery of one of said first and second rings; and
       a cam follower contacting the cam to axially displace the first and second rings, the cam follower disposed on the other of said first and second rings;
       wherein the cam follower extends radially outward from an outer edge of the other of the first and second rings.

15. The plaster collar assembly of claim 14, further including:
    means for axially aligning said first and second rings during rotation; and
    means for rotationally locking said first and second rings.

16. The plaster collar assembly of claim 15, wherein said locking means comprises:
    a fastener for securing said first and second rings to each other; and
    a spring, in communication with the fastener, for urging said first and second rings together; and
    said aligning means comprises an arcuate slot in at least one of said first and second rings, the arcuate slot for receiving a pin extending between said rings.

17. The plaster collar assembly of claim 1, wherein the cam extends axially from an outer edge of one of the first and second rings.

18. The plaster collar assembly of claim 3, wherein said included surface is curved.

19. The plaster collar assembly of claim 1, further comprising a spring disposed between the first and second rings, wherein the spring urges the first and second rings together.

20. The plaster collar assembly of claim 19, wherein the spring comprises a leaf spring.

21. The plaster collar assembly of claim 19, wherein the spring comprises coiled spring.

22. The plaster collar assembly of claim 19, wherein the spring comprises a helical spring.

* * * * *